(12) United States Patent
He

(10) Patent No.: US 12,294,224 B1
(45) Date of Patent: May 6, 2025

(54) LIGHTING DEVICE AND TOY

(71) Applicant: Zhiang He, Yongkang (CN)

(72) Inventor: Zhiang He, Yongkang (CN)

( * ) Notice: Subject to any disclaimer, the term of this patent is extended or adjusted under 35 U.S.C. 154(b) by 0 days.

(21) Appl. No.: 19/000,846

(22) Filed: Dec. 24, 2024

(30) Foreign Application Priority Data

Nov. 28, 2024 (CN) .......................... 202422934943.3

(51) Int. Cl.
| | |
|---|---|
| *H02J 50/00* | (2016.01) |
| *F21V 15/01* | (2006.01) |
| *F21V 23/02* | (2006.01) |
| *F21V 33/00* | (2006.01) |
| *H02J 50/10* | (2016.01) |

(52) U.S. Cl.
CPC ............ *H02J 50/005* (2020.01); *F21V 15/01* (2013.01); *F21V 23/023* (2013.01); *F21V 33/008* (2013.01); *H02J 50/10* (2016.02)

(58) Field of Classification Search
CPC ...... F21V 33/008; F21V 15/01; F21V 23/023; H02J 50/005; H02J 50/10; A63H 33/26
USPC ............................. 362/192, 35; 446/242, 266
See application file for complete search history.

(56) References Cited

U.S. PATENT DOCUMENTS

| | | | | |
|---|---|---|---|---|
| 5,957,562 | A * | 9/1999 | Hill ......................... | F21V 21/22 362/253 |
| 6,592,423 | B1 * | 7/2003 | Boyle ..................... | A63H 33/22 446/175 |
| 7,361,074 | B1 * | 4/2008 | Periman ................. | A63H 37/00 362/199 |
| 2016/0074759 | A1 * | 3/2016 | Kelly ...................... | A63H 1/24 446/242 |

* cited by examiner

*Primary Examiner* — Thomas M Sember
(74) *Attorney, Agent, or Firm* — Hemisphere Law, PLLC; Zhigang Ma

(57) ABSTRACT

A light-emitting device and a toy are provided. The light-emitting device includes a connecting shaft assembly, a first light-emitting assembly and a second light-emitting assembly. The first light-emitting assembly and the second light-emitting assembly are distributed along an axis direction of the connecting shaft assembly. The first light-emitting assembly includes a rotating component, a first magnetic induction coil, a first magnetic piece and a first lamp group. The rotating component can rotate relative to the connecting shaft assembly to drive the first induction coil to rotate relative to the first magnetic piece. The second light-emitting assembly includes a connecting piece, a second magnetic induction coil, a second magnetic piece and a second lamp group. Therefore, the rotation of the rotating component can enable the first light-emitting assembly and the second light-emitting assembly to emit light, so that multi-level light emission is realized and the light-emitting area of is more comprehensive.

11 Claims, 4 Drawing Sheets

LIGHTING DEVICE AND TOY

TECHNICAL FIELD

The disclosure relates to the technical field of toys, and more particularly to a light-emitting device and a toy.

BACKGROUND

Light-emitting toys are deeply loved by children due to their unique fun. In order to make the toys more energy-saving, some toys can generate induced current by cutting magnetic induction lines when the wheels rotate, thereby supplying power to the wheels to make them light up, adding to the play atmosphere. However, some existing toys have relatively complex connection structures. If other areas of the toy need to light up, additional batteries are often needed to provide the power needed for lighting, but this design undoubtedly also increases the production cost of the toy, thereby increasing the price of the toy and reducing its market competitiveness.

SUMMARY

The disclosure provides a lighting device and a toy, which can improve the problem of increased production cost caused by additional battery configuration.

In a first aspect, the disclosure provides a lighting device, which includes a connecting shaft assembly, a first light-emitting assembly and a second light-emitting assembly. The first light-emitting assembly and the second light-emitting assembly are distributed along an axis direction of the connecting shaft assembly. The first light-emitting assembly includes a rotating component, a first magnetic induction coil, a first magnetic piece and a first lamp group. The first magnetic induction coil is disposed in the rotating component, the rotating component is fitted on the connecting shaft assembly, the first magnetic piece is disposed on the connecting shaft assembly, and a position of the first magnetic piece corresponds to that of the first magnetic induction coil. The first lamp group is connected to the first magnetic induction coil, and the rotating component is capable of rotating relative to the connecting shaft assembly to drive the first magnetic induction coil to rotate relative to the first magnetic piece. The second light-emitting assembly includes a connecting piece, a second magnetic induction coil, a second magnetic piece and a second lamp group. The second magnetic induction coil is disposed in the connecting piece, the connecting piece is fixedly connected to the connecting shaft assembly, the second magnetic piece is disposed outside the rotating component, and a position of the second magnetic piece corresponds to that of a second magnetic induction coil. The second lamp group is connected to the second magnetic induction coil.

In an embodiment, the connecting shaft assembly further includes a connecting shaft, a first bearing and a second bearing. The first bearing and the second bearing are both fitted over the connecting shaft and are distributed at intervals along the axial direction of the connecting shaft assembly, and the first bearing and the second bearing are connected to the rotating component.

In an embodiment, the first magnetic piece is fitted on the connecting shaft, and the first bearing and the second bearing are clamped between the first magnetic piece.

In an embodiment, the connecting shaft includes a limiting convex part, the rotating component includes a top cover and a rotating piece. In the axial direction of the connecting shaft assembly, the rotating piece abuts against a side of the limiting convex part, the top cover extends in a direction facing away from the rotating piece, and the second magnetic piece is fitted on the top cover. The connecting piece is at least partially fitted on the top cover.

In an embodiment, the lighting device further includes a protective shell, the protective shell is fitted on the second light-emitting assembly, and the protective shell is a transparent structure.

In a second aspect, the disclosure provides a toy, which includes the light-emitting device as described above.

In an embodiment, the toy includes a connecting rod connected to an end of the connecting shaft assembly close to the second light-emitting assembly, and the rotating component is used to frictionally roll with a bearing surface.

In an embodiment, the connecting rod assembly includes a first connecting rod and a second connecting rod detachably connected, and the first connecting rod is connected to the connecting shaft and the second connecting rod individually. In another embodiment, the connecting rod assembly includes a first connecting rod, a second connecting rod, and a third connecting rod which are detachably connected sequentially in that order. The first connecting rod is connected to the connecting shaft.

In an embodiment, the toy further includes a handheld ring connected to an end of the connecting rod facing away from the second light-emitting assembly.

In an embodiment, the toy further includes a cushion pad, at least part of an outer wall of the handheld ring is covered with the cushion pad.

The light-emitting device of the disclosure includes the connecting shaft assembly, the first light-emitting assembly, and the second light-emitting assembly. The first light-emitting assembly includes the rotating component, the first magnetic induction coil, the first magnetic piece, and the first lamp group. The position of the first magnetic piece corresponds to that of the first magnetic induction coil. When the rotating component rotates, it can drive the first magnetic induction coil to rotate relative to the first magnetic piece and cut the magnetic induction line, thereby causing the first magnetic induction coil to generate induced current and supply power to the first lamp group. In addition, the second magnetic induction coil is located inside the connecting piece, the connecting piece is fixedly connected to the connecting shaft assembly, the second magnetic piece is located outside the rotating component, and the position of the second magnetic piece corresponds to that of the second magnetic induction coil. When the rotating component rotates, it drives the second magnetic piece to rotate relative to the second magnetic induction coil and cut the magnetic induction line, thereby causing the second magnetic induction coil to generate induced current and supply power to the second lamp group. Therefore, the rotation of the rotating component can not only make the first lamp group of the first light-emitting assembly emit light, but also make the second lamp group of the second light-emitting assembly emit light, thereby achieving multi-level light emission. Moreover, the first light-emitting assembly and the second light-emitting assembly are distributed along the axis direction of the connecting shaft assembly, making the light-emitting area of the light-emitting device more three-dimensional and comprehensive, and increasing the fun of the light-emitting device. Compared to traditional light-emitting devices that use battery power to emit light, the light-emitting device of disclosure can save more energy, reduce the production cost and improve the product competitiveness.

Figure 1:
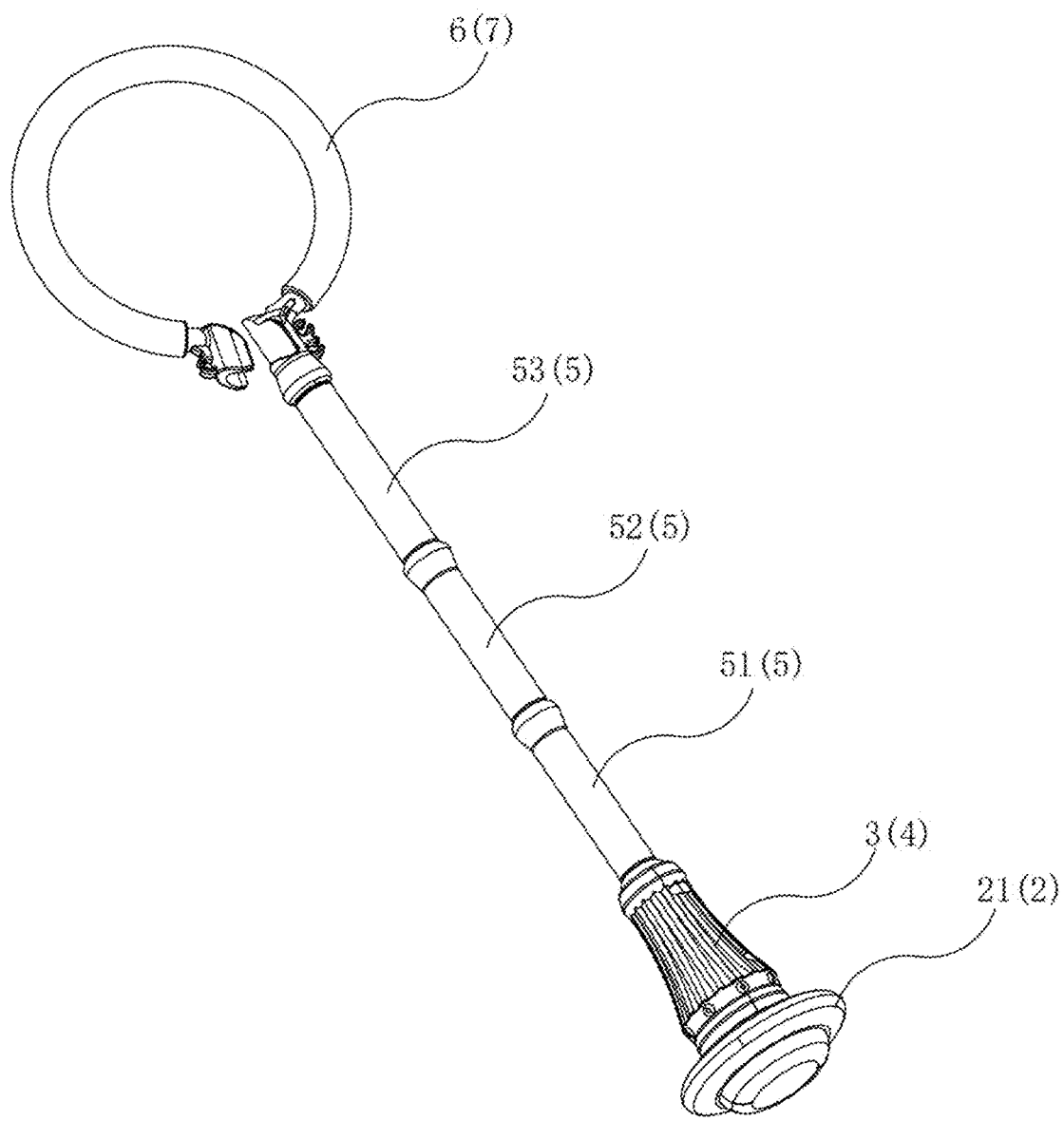
FIG. 1 illustrates a schematic structural diagram of a toy according to the disclosure.
Figure 2:
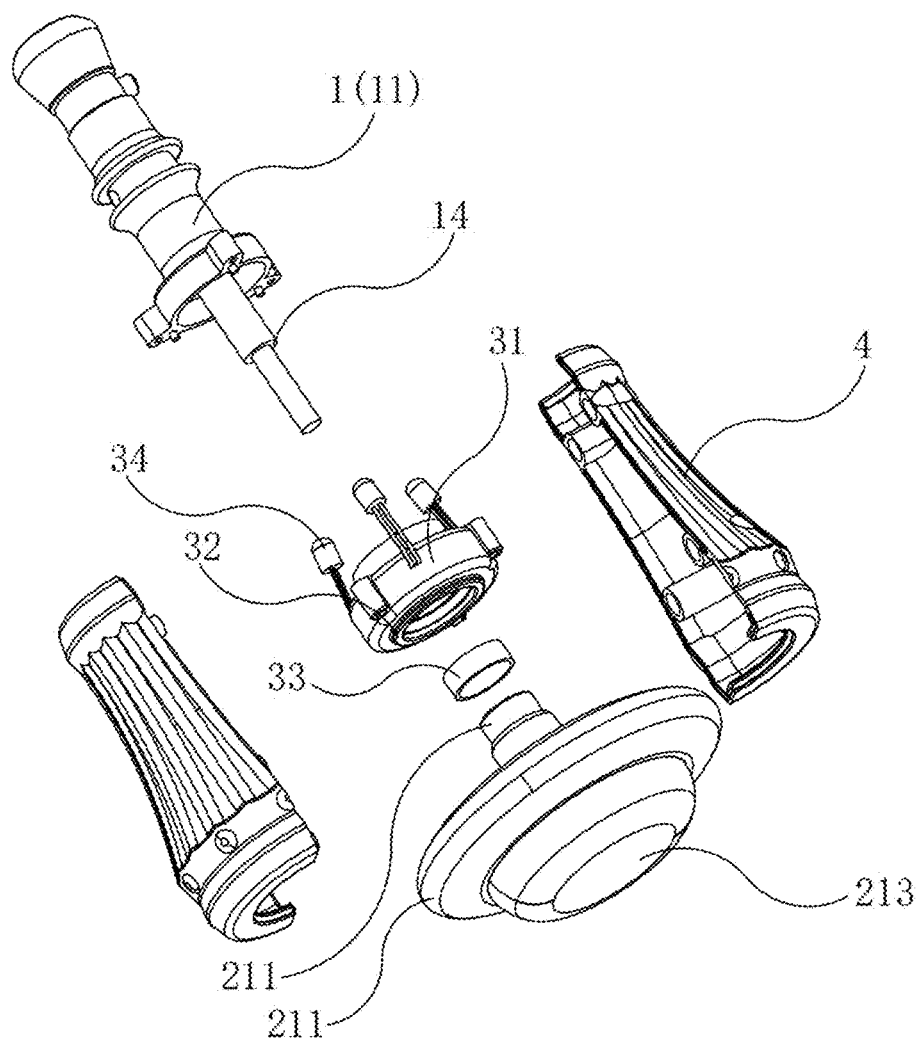
FIG. 2 illustrates a partial structural exploded diagram of the toy according to the disclosure.

DESCRIPTION OF REFERENCE SIGNS 1. connecting shaft assembly; 11. connecting shaft; 12. first bearing; 13. second bearing; 14. limiting convex part; 2. first light-emitting assembly; 21. rotating component; 211. top cover; 212. rotating piece; 213. bottom cover; 22. first magnetic induction coil; 23. first magnetic piece; 24. first lamp group; 3. second light-emitting assembly; 31. connecting piece; 32. second magnetic induction coil; 33. second magnetic piece; 34. second lamp group; 4. protective shell; 5. connecting rod assembly; 51. first connecting rod; 52. second connecting rod; 53. third connecting rod; 6. handheld ring; 7. cushion pad.

DETAILED DESCRIPTION OF EMBODIMENTS

Hereinafter, with reference to the accompanying drawings, the illustrated embodiments of the disclosure will be described in detail. In the following explanation, the same signs are assigned to the same components, and repeated explanations are omitted. In addition, the accompanying drawings are only schematic diagrams, and the proportion of dimensions between components or the shape of components may differ from the actual situation. It should be noted that all directional indications (such as up, down, left, right, front, back, etc.) in the embodiments of the disclosure are only used to explain the relative position relationship and motion of each component in a specific posture. If the specific posture changes, the directional indication will also change accordingly.

It should also be noted that when a component is referred to as "fixed" or "disposed" on another component, it can be directly on the other component or there may be an intervening component. When a component is referred to as "connected to" another component, it can be directly connected to another component or there may be an intervening component.

Referring to FIG. 1 to FIG. 4, the disclosure provides a light-emitting device including a connecting shaft assembly 1, a first light-emitting assembly 2, and a second light-emitting assembly 3. The first light-emitting assembly 2 and the second light-emitting assembly 3 are distributed along an axis direction of the connecting shaft assembly 1. The first light-emitting assembly 2 includes a rotating component 21, a first magnetic induction coil 22, a first magnetic piece 23, and a first lamp group 24. The first magnetic induction coil 22 is located inside the rotating component 21, and the rotating component 21 is fitted on the connecting shaft assembly 1. The first magnetic piece 23 is located on the connecting shaft assembly 1, and the position of the first magnetic piece 23 corresponds to that of the first magnetic induction coil 22. The first lamp group 24 is connected to the first magnetic induction coil 22, and the rotating component 21 can rotate relative to the connecting shaft assembly 1 to drive the first induction coil to rotate relative to the first magnetic piece 23. The second light-emitting assembly 3 includes a connecting piece 31, a second magnetic induction coil 32, a second magnetic piece 33, and a second lamp group 34. The second magnetic induction coil 32 is located inside the connecting piece 31, the connecting piece 31 is fixedly connected to the connecting shaft assembly 1. The second magnetic piece 33 is located outside the rotating component 21, and the position of the second magnetic piece 33 corresponds to that of the second magnetic induction coil 32. The second lamp group 34 is connected to the second magnetic induction coil 32.

According to the above structure, when the rotating component 21 rotates, it can drive the first magnetic induction coil 22 to rotate relative to the first magnetic piece 23 and cut the magnetic induction line, thereby causing the first magnetic induction coil 22 to generate induced current and supply power to the first lamp group 24. In addition, when the rotating component 21 rotates, it also drives the second magnetic piece 33 to rotate relative to the second magnetic induction coil 32, cutting the magnetic induction line, thereby causing the second magnetic induction coil 32 to generate induced current and supply power to the second lamp group 34. Therefore, the rotation of the rotating component 21 can not only make the first lamp group 24 of the first light-emitting assembly 2 emit light, but also make the second lamp group 34 of the second light-emitting assembly 3 emit light, thereby achieving multi-level light emission. Moreover, the first light-emitting assembly 2 and the second light-emitting assembly 3 are distributed along the axis direction of the connecting shaft assembly 1, making the light-emitting area of the light-emitting device more three-dimensional and comprehensive, and increasing the fun of the light-emitting device. Compared to traditional light-emitting devices that use battery power to emit light, the light-emitting device of disclosure can save more energy, reduce the production cost and improve the product competitiveness.

Figure 3:
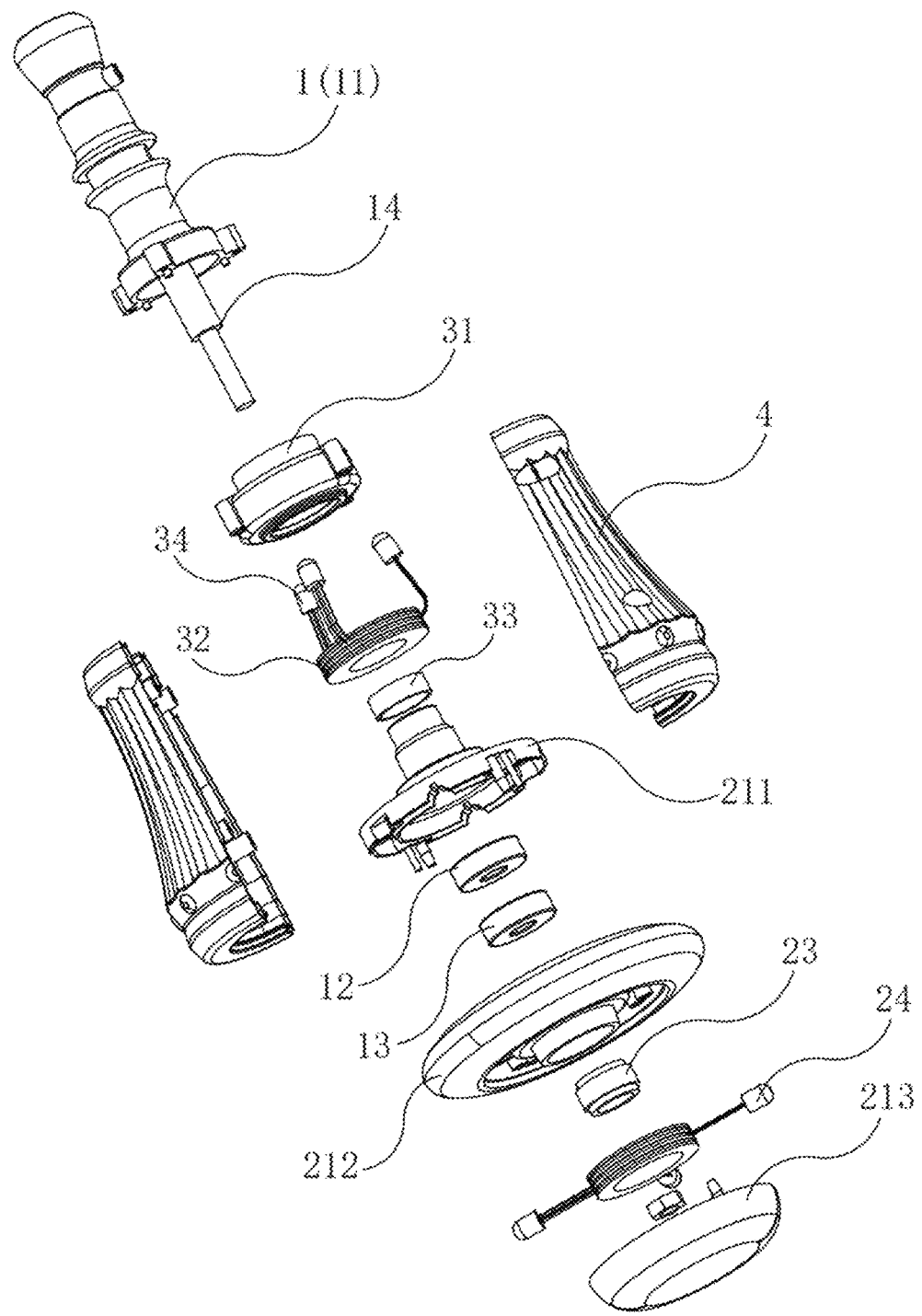
FIG. 3 illustrates another partial structural exploded diagram of the toy according to the disclosure.
Figure 4:
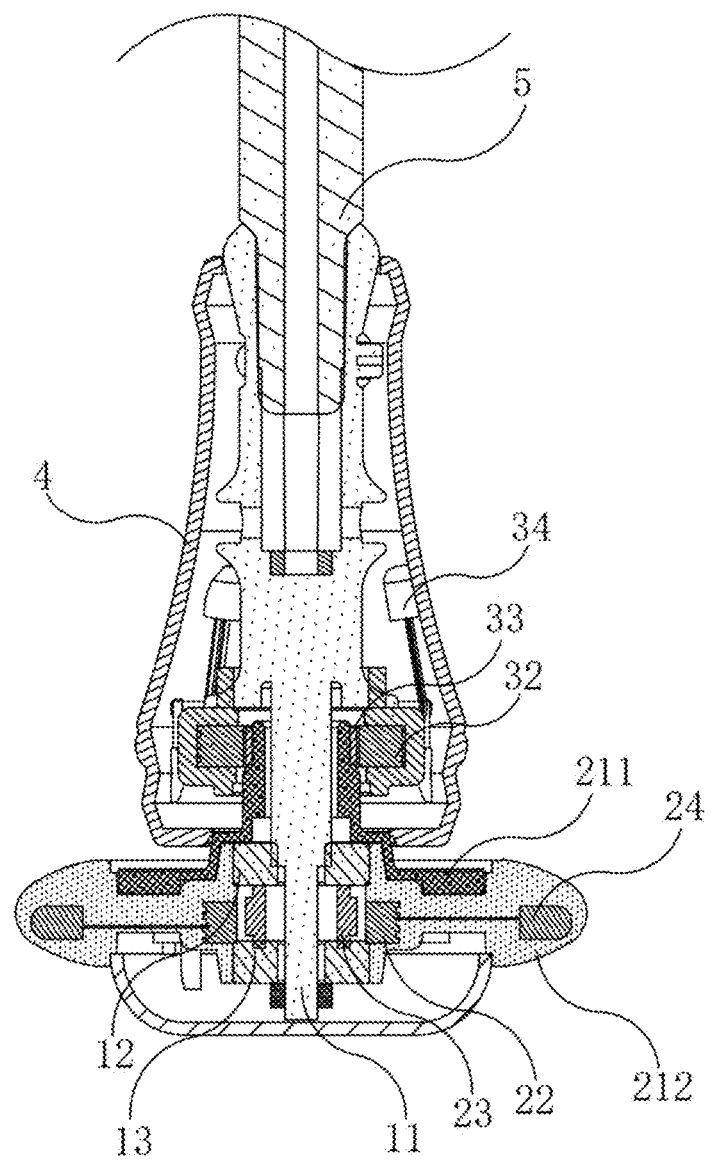
FIG. 4 illustrates a schematic partial sectional view of the toy according to the disclosure.

Referring to FIG. 3 and FIG. 4, in some embodiments, the connecting shaft assembly 1 further includes a connecting shaft 11, a first bearing 12, and a second bearing 13. The first bearing 12 and the second bearing 13 are both fitted on the connecting shaft 11 and distributed at intervals along the axis direction of the connecting shaft assembly 1. The first bearing 12 and the second bearing 13 are connected to the rotating component 21. Therefore, the setting of two bearings can provide sufficient support for the rotating component 21, reduce friction, and make the rotating component 21 more stable during rotation.

In some embodiments, the first magnetic piece 23 is fitted on the connecting shaft 11, and the first bearing 12 and the second bearing 13 are clamped between the first magnetic piece 23. Therefore, the first bearing 12 and the second bearing 13 play a limiting role on the first magnetic piece 23, which can clamp and fix the first magnetic piece 23 to restrict its movement in the axial direction of the connecting shaft 11.

Referring to FIG. 4, in some embodiments, the connecting shaft 11 includes a limiting convex part 14, and the rotating component 21 includes a top cover 211 and a rotating piece 212 that are interconnected. In the axial direction of the connecting shaft assembly 1, the rotating piece 212 abuts against a side of the limiting convex part 14, and the top cover 211 extends in a direction facing away from the rotating piece 212. The second magnetic part 33 is fitted onto the top cover 211. The connecting piece 31 is at least partially fitted onto the top cover 211. In some embodiments, the rotating component 21 may further include a bottom cover 213, which is connected to a side of the rotating piece 212 facing away from the top cover 211.

In some embodiments, the rotating piece 212 may be a wheel. In other embodiments, the rotating piece 212 may also be a rolling ball. More particularly, the rotating piece 212 is made of transparent material and can emit the light of the first lamp group 24.

In some embodiments, the light-emitting device further includes a protective shell 4, which is fitted on the second light-emitting assembly 3. The protective shell 4 is a transparent structure. Therefore, the setting of the protective shell 4 can provide protection for the second light-emitting assembly 3, prevent external components from colliding with the second light-emitting assembly 3, and also have waterproof and dustproof effects. Specifically, the protective shell 4 may include a first shell body and a second shell body, which are connected by screws. The connected first shell body and second shell body can wrap around the second light-emitting assembly 3.

The disclosure also provides a toy including the aforementioned light-emitting device.

Referring to FIG. 1, in some embodiments, the toy includes a connecting rod assembly 5, which is connected to an end of the connecting shaft assembly 1 close to the second light-emitting assembly 3. The rotating component 21 is used to frictionally roll with a bearing surface. Thus, the user can hold the connecting rod assembly 5 and press the rotating component 21 against the ground or other bearing surface. When the rotating component 21 rolls on the ground, the first lamp group 24 and the second lamp group 34 of the toy can emit light, so that the operation is convenient, and the toy is interesting and has a sense of atmosphere.

In some embodiments, the connecting rod assembly 5 includes a first connecting rod 51 and a second connecting rod 52 detachably connected, and the first connecting rod 51 is connected to the connecting shaft 11 and the second connecting rod 52 individually. In other embodiments, the connecting rod assembly 5 includes a first connecting rod 51, a second connecting rod 52, and a third connecting rod 53 which are detachably connected sequentially in that order. The first connecting rod 51 is connected to the connecting shaft 11. More particularly, the first connecting rod 51, the second connecting rod 52, and the third connecting rod 53 can be threaded together, and users can choose to use one or more connecting rods according to the height of the child.

In some embodiments, the toy further includes a handheld ring 6, which is connected to an end of the connecting rod assembly 5 away from the second light-emitting assembly 3. Therefore, the handheld ring 6 can be easily held by the user and used more conveniently.

In some embodiments, the toy further includes a cushion pad 7, and an outer wall of the handheld ring 6 is at least partially covered with the cushion pad 7. In some embodiments, the cushion pad 7 may be a sponge. In other embodiments, the cushion pad 7 can also be a rubber pad. As a result, the arrangement of the cushion pad 7 can improve the hand-holding touch feeling of a user, and can also achieve the effects of skid resistance and shock absorption, thereby improving the user experience.

In summary, when the rotating component 21 rotates, it can drive the first magnetic induction coil 22 to rotate relative to the first magnetic piece 23 and cut the magnetic induction line, thereby causing the first magnetic induction coil 22 to generate induced current and supply power to the first lamp group 24. In addition, when the rotating component 21 rotates, it also drives the second magnetic piece 33 to rotate relative to the second magnetic induction coil 32, cutting the magnetic induction line, thereby causing the second magnetic induction coil 32 to generate induced current and supply power to the second lamp group 34. Therefore, the rotation of the rotating component 21 can not only make the first lamp group 24 of the first light-emitting assembly 2 emit light, but also make the second lamp group 34 of the second light-emitting assembly 3 emit light, thereby achieving multi-level light emission. Moreover, the first light-emitting assembly 2 and the second light-emitting assembly 3 are distributed along the axis direction of the connecting shaft assembly 1, making the light-emitting area of the light-emitting device more three-dimensional and comprehensive, and increasing the fun of the light-emitting device. Compared to traditional light-emitting devices that use battery power to emit light, the light-emitting device of disclosure can save more energy, reduce the production cost and improve the product competitiveness.

In the description of the disclosure, the terms "first" and "second" are used for descriptive purposes only and are not to be construed as indicating or implying relative importance or as implying a number of indicated features. Thus, the features defined with "first" and "second" may explicitly or implicitly include one or more features. In the description of the disclosure, "multiple" means two or more unless specifically defined otherwise.

In the above embodiments, the description of each embodiment has its own emphasis, and for a part not described in detail in a certain embodiment, reference can be made to the relevant description of other embodiments.

The embodiments, implementation modes and related technical features of the disclosure may be combined or replaced with each other without conflict.

The foregoing is only the illustrated embodiments of the disclosure, and is not intended to limit the disclosure in any form. However, any simple modifications, equivalent variations, and embellishments made to the foregoing embodiments according to the technical essence of the disclosure without departing from the content of the technical solution of the disclosure still falls within the scope of the technical solution of the disclosure.

Although the disclosure has been described in detail with reference to the drawings and embodiments, it can be understood that the above description does not limit the disclosure in any form. Those skilled in the art may make modifications and changes to the disclosure as required without deviating from the actual spirit and scope of the disclosure, and such modifications and changes fall within the scope of the disclosure.

What is claimed is:

1. A light-emitting device, comprising a connecting shaft assembly, a first light-emitting assembly and a second light-emitting assembly, wherein the first light-emitting assembly and the second light-emitting assembly are distributed along an axis direction of the connecting shaft assembly;

wherein the first light-emitting assembly comprises a rotating component, a first magnetic induction coil, a first magnetic piece and a first lamp group; the first magnetic induction coil is disposed in the rotating component, the rotating component is fitted on the connecting shaft assembly, the first magnetic piece is disposed on the connecting shaft assembly, a position of the first magnetic piece corresponds to that of the first magnetic induction coil, the first lamp group is connected to the first magnetic induction coil, and the rotating component is capable of rotating relative to the connecting shaft assembly to drive the first magnetic induction coil to rotate relative to the first magnetic piece; and wherein the second light-emitting assembly comprises a connecting piece, a second magnetic induction coil, a second magnetic piece and a second lamp group; the second magnetic induction coil is disposed in the connecting piece, the connecting piece is fixedly connected to the connecting shaft assembly, the second magnetic piece is disposed outside the rotating component, a position of the second magnetic piece corresponds to that of a second magnetic induction coil, and the second lamp group is connected to the second magnetic induction coil.

2. The light-emitting device as claimed in claim 1, wherein the connecting shaft assembly further comprises a connecting shaft, a first bearing, and a second bearing; the first bearing and the second bearing are both fitted on the connecting shaft and are distributed at intervals along the axial direction of the connecting shaft assembly; and the first bearing and the second bearing are connected to the rotating component.

3. The light-emitting device as claimed in claim 2, wherein the first magnetic piece is fitted on the connecting shaft, and the first bearing and the second bearing are clamped on the first magnetic piece.

4. The light-emitting device as claimed in claim 2, wherein the connecting shaft comprises a limiting convex part, the rotating component comprises a top cover and a rotating piece connected to each other;

in the axial direction of the connecting shaft assembly, the rotating piece abuts against a side of the limiting convex part, the top cover extends in a direction facing away from the rotating piece, and the second magnetic piece is fitted on the top cover; and the connecting piece is at least partially fitted on the top cover.

5. The light-emitting device as claimed in claim 2, further comprising a protective shell; wherein the protective shell is fitted on the second light-emitting assembly, and the protective shell is a transparent structure.

6. A toy, comprising the light-emitting device as claimed in claim 1.

7. The toy as claimed in claim 6, comprising: a connecting rod assembly, wherein the connecting rod assembly is connected to an end of the connecting shaft assembly close to the second light-emitting assembly; and the rotating component is configured to frictionally roll with a bearing surface.

8. The toy as claimed in claim 6, wherein the connecting rod assembly comprises a first connecting rod and a second connecting rod detachably connected, and the first connecting rod is connected to the connecting shaft and the second connecting rod individually.

9. The toy as claimed in claim 6, wherein the connecting rod assembly comprises a first connecting rod, a second connecting rod and a third connecting rod which are detachably connected sequentially in that order, and the first connecting rod is connected to the connecting shaft.

10. The toy as claimed in claim 6, further comprising a handheld ring, wherein the handheld ring is connected to an end of the connecting rod assembly facing away from the second light-emitting assembly.

11. The toy as claimed in claim 10, further comprises a cushioning pad, wherein at least part of an outer wall of the handheld ring is covered with the cushioning pad.

* * * * *